Figure 1:
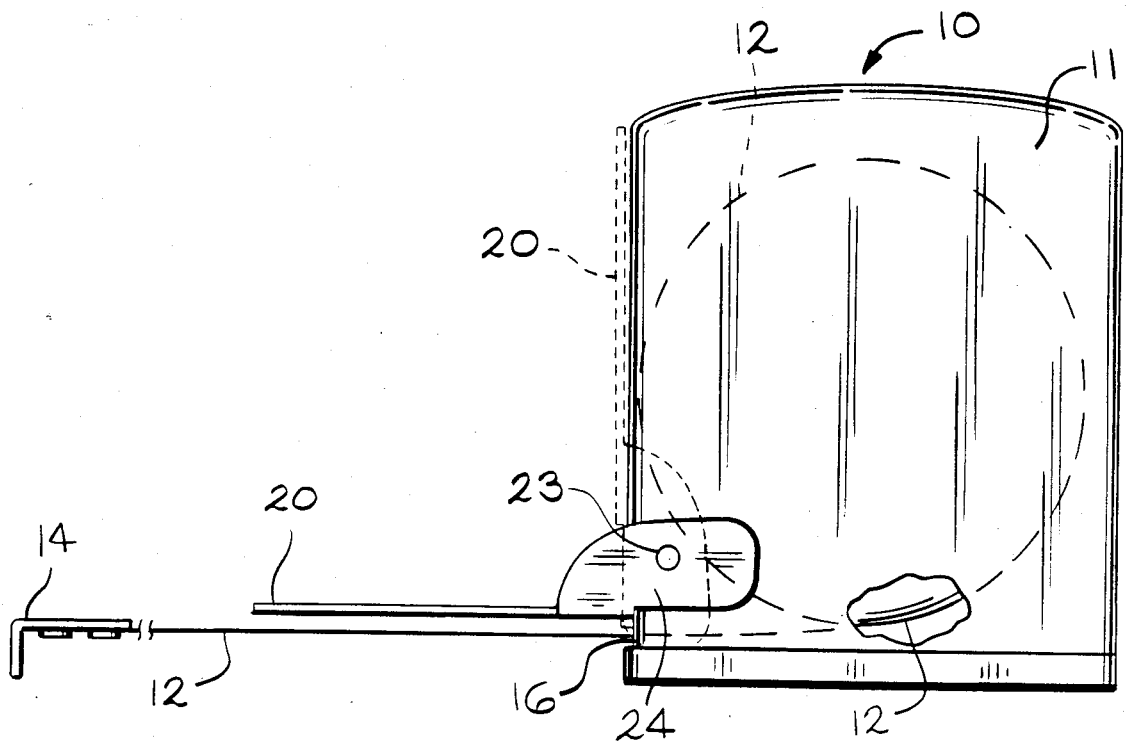

United States Patent [19]

Haack

[11] Patent Number: 4,547,969

[45] Date of Patent: Oct. 22, 1985

[54] FRACTION INDICATOR AND METHOD OF USE

[76] Inventor: Brian P. Haack, 2050 Haslett Rd., Haslett, Mich. 48840

[21] Appl. No.: 575,142

[22] Filed: Jan. 30, 1984

[51] Int. Cl.$^4$ .............................................. G01B 3/10
[52] U.S. Cl. ........................................ 33/138; 33/494
[58] Field of Search ................ 33/137, 138, 490, 494, 33/166, 487; 350/110, 116, 115; 116/304

[56] References Cited

U.S. PATENT DOCUMENTS

| | | | |
|---|---|---|---|
| 1,776,245 | 9/1930 | Barrett | 33/494 |
| 2,549,503 | 4/1951 | McCully | 33/138 |
| 2,867,187 | 1/1959 | Huggins | 33/138 X |
| 3,181,242 | 5/1965 | Cook . | |
| 3,205,584 | 9/1965 | Overaa . | |
| 3,324,560 | 6/1967 | Snyder . | |
| 3,336,678 | 8/1967 | Chamberlain et al. . | |
| 3,534,478 | 10/1970 | Fisher . | |
| 3,744,134 | 7/1973 | Zima . | |

FOREIGN PATENT DOCUMENTS

| | | | |
|---|---|---|---|
| 1297849 | 5/1962 | France | 33/487 |
| 3347 | 11/1966 | Japan | 33/137 R |
| 0104201 | 8/1981 | Japan | 33/137 R |

*Primary Examiner*—Harry N. Haroian
*Attorney, Agent, or Firm*—Ian C. McLeod

[57] ABSTRACT

An indicator (20) for a tape measure (10) is described. The indicator is marked with indicia (21) and arabic numerals (22) designating fractional increments between whole number measurements on the tape. In the preferred form the indicator is pivoted on the housing such as on pins 23 so the indicator can be folded adjacent the housing when not in use and can be unfolded and superimposed over the tape 12 when in use.

13 Claims, 2 Drawing Figures

U.S. Patent  Oct. 22, 1985  4,547,969

FRACTION INDICATOR AND METHOD OF USE

BACKGROUND OF THE INVENTION

1. Field of the Invention

The present invention relates to a fraction indicator adapted to be mounted on the housing of a reel type tape measure so as to provide ease of reading fractions with the tape measure. In particular the present invention relates to a fraction indicator which can be superimposed over first fraction marks on the tape such that second fraction marks and associated arabic numeral fractions can be read by a user.

2. Prior Art

The prior art has described various devices associated with a reel type tape measure for facilitating the reading of measurements. U.S. Pat. No. 2,867,187 to Huggins describes a measuring tape with a telltale 21 which is activated when an actuator 20 engages a wall or the like to indicate that an increment of measurement (2") is to be added to the tape portion which is outside a housing. U.S. Pat. No. 3,181,242 to Cook describes a straight edge attachment 27 and 28 for a tape for measuring or drawing angles from the tape. U.S. Pat. No. 3,205,584 to Overaa describes a magnifying lens 12 for facilitating reading of the fraction marks on a tape measure. U.S. Pat. No. 3,324,560 to Snyder describes a collar 15 for the tape which also functions as a lens for reading the fraction marks. U.S. Pat. No. 3,336,678 to Chamberlain describes a marking attachment for a tape measure which has pointer 15 or 32 for indicating the position of a marking tool 14. U.S. Pat. No. 3,534,478 to Fisher shows datum points 10 for indicating a measurement on a tape. U.S. Pat. No. 3,744,134 to Zima shows an abutment slide which has an opening for viewing the tape measurements. In none of these patents is any means described for facilitating direct reading of fraction marks between the unitary number markings of the tape. The problem is that such fraction marks are easily misread, because of the closeness of spacing of the fraction marks.

OBJECTS

It is therefore an object of the present invention to provide a fraction indicator for attachment to a tape measure which greatly reduces the risk of an inaccurate reading of the fractional marks on the tape. Further it is an object of the present invention to provide a fraction indicator which is easily adapted for mounting on a conventional reel tape measure. Further still it is an object of the present invention to provide a fraction indicator which is simple and inexpensive to construct. These and other objects will become increasingly apparent by reference to the following description and to the drawings.

IN THE DRAWINGS

FIG. 1 is a front view of a tape measure 10 supporting a foldable fraction indicator 20 mounted on a housing 11 and in particular showing the fraction indicator in an unfolded position in solid lines and in a folded position in broken lines.

Figure 2:
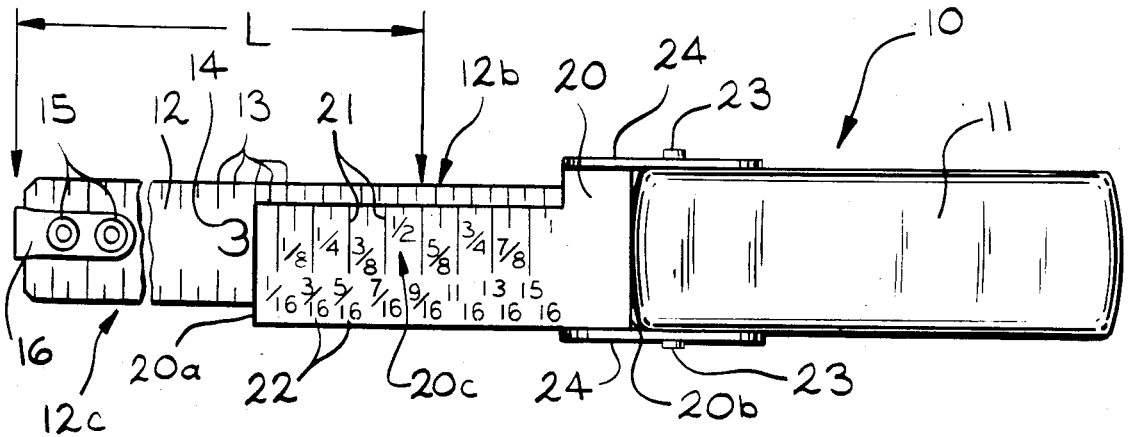

FIG. 2, is a plan view of the indicator 20 shown in the unfolded position as in FIG. 1 showing first marks 13 on an extended portion of the tape 12 from the housing 10 and second marks 21 and the fractions 22 in arabic numerals on the fraction indicator with opposed arrows showing the measurement of a length L.

GENERAL DESCRIPTION

The present invention relates to a tape measure (10) including a housing (11) with an opening (16) and a tape (12), with first fraction marks (13) marked along a length and on at least one of two opposing edges (12b, 12c) of the tape and with whole numbers (14) showing the increments of measurement, the tape being disposed in the housing and projecting through the opening so that the tape can be extended from the housing for measuring and coiled in the housing for storage of the tape the improvement which comprises:

fraction indicator (20) mounted on the housing adjacent the opening wherein the fraction indicator has an elongate surface (20c) between two opposing ends (20a and 20b) one of which is away from the housing which is superimposed over the tape so that the first fraction marks are visible to a user and wherein the fraction indicator is marked with fractions (22) of measurement in arabic numerals adjacent second fraction marks (21) which can be positioned adjacent the first fraction marks so that a selected first fraction mark on the tape can be easily translated into a fraction by the user.

Further the present invention relates to the method of measuring a length which comprises:

(a) providing a tape measure (10) including a housing (11) with an opening (16) and a tape (12), with first fraction marks (13) marked along a length on at least one of two opposing edges (12b, 12c) of the tape and with whole numbers (14) showing the increments of measurement, the tape being disposed in the housing and projecting through the opening so that the tape can be extended from the housing for measuring and coiled in the housing for storage of the tape and including a fraction indicator (20) mounted on the housing adjacent the opening wherein the fraction indicator has an elongate surface (20c) between two opposing ends (20a and 20b) one of which is away from the housing which is superimposed over the tape so that the first fraction marks are visible to a user and wherein the fraction indicator is marked with fractions (22) of measurement in arabic numerals adjacent second fraction marks (21) which can be positioned adjacent the first fraction marks so that a selected first fraction mark on the tape can be easily translated into a fraction by the user;

(b) extending the tape to a length which places the end of the fraction indicator away from the housing on a whole number of a unit of measurement fractionally shorter than the length to be measured; and (c) measuring the length by reading the fraction indicator and adding the fraction to the whole number adjacent the end of the fraction indicator away from the housing.

Finally the present invention relates to a device adapted for mounting on a housing (11) of a tape measure (10) to facilitate the measurement of fractions which comprises:

a fraction indicator (20) including retaining means for mounting the indicator on a housing of the tape measure with an opening (16) for extending the tape (12), wherein the fraction indicator has an elongate surface (20c) between opposing ends (20a and 20b) so that one end is away from the housing which can be superimposed over the tape so that first fraction marks (13) on the tape are visible and wherein the fraction indicator is marked with fractions (22) in arabic numerals adjacent second fraction marks (21) which can be positioned adjacent the first fraction marks so that a first selected mark on the tape can be easily translated into a fraction by the user.

In the preferred form the fraction indicator (20) is pivotably mounted (23) on the housing and folds towards the housing (11) when not in use.

SPECIFIC DESCRIPTION

FIGS. 1 and 2 show a standard tape measure 10 including a housing 11, a coiled tape 12 with an extended portion of the tape 12 outside of the housing 11. The tape 12 is provided with fraction marks 13 which are marked in increments 13 of 1/16, ⅛, ¼, ½ and with whole number numerals 14 only for the one inch measuring increments (e.g. 3 inches as shown in FIG. 2). The first fraction marks 13 are enlarged for clarity at about twice normal size. The distal end of the tape 12 away from the housing 11 is provided with an angled clip 16 secured to the tape 12 by rivets 15. The tape 12 is dispensed from an opening 16 in the housing 11. The problem is to read the fraction mark 13 on tape 12. Many people have difficulty in interpretting the fractions from the first fraction marks 13 because of their closeness.

The fraction indicator 20 is marked on an elongate surface 20c with second fraction marks 21 and fractions 22 in arabic numerals between ends 12a and 12b which show the fractional measurement to be directly read from the tape 12. A measurement L of 3 9/16 inch is shown by the arrows opposite the edge 12b of the tape 12 in FIG. 2.

The fraction indicator 20 is preferably mounted on the housing 11 by means of pivot pins 23 through projections 24 from the fraction indicator 20. In this manner the fraction indicator 20 can be folded, a shown in FIG. 1 when not in use. The pivoted fraction indicator 20 is preferred however, it will be appreciated that other retaining means on the housing 11 can be used.

As shown in FIG. 2, the indicator 20 is offset from the extended tape 12 so that the first fraction marks 13 are visible. It will be appreciated that all or part of the indicator 20 could be transparent with the second fraction marks 21 and fractions 22 printed thereon. All of these variations will be obvious to those skilled in the art.

In use an end 20a of the indicator is positioned on the whole number 14 fractionally shorter than the length to be measured. The fraction representing the length is then read by the user. The indicator 20 provides error free measurement of the fractional length.

Numerous variations will occur to those skilled in the art. For instance, the fractions indicator could be fitted to tape measures which are currently in use. It is intended that all of these variations be included within the scope of the present invention.

I claim:

1. In a tape measure (10) including a housing (11) with an opening (16) and a tape (12), with first fraction marks (13) marked along a length and on at least one of two opposing edges (12b, 12c) of the tape and with whole numbers (14) showing the increments of measurement, the tape being disposed in the housing and projecting through the opening so that the tape can be extended from the housing for measuring and coiled in the housing for storage of the tape the improvement which comprises:

a fraction indicator (20) mounted on the housing adjacent the opening wherein the fraction indicator has an elongate surface (20c) between two opposing ends (20a and 20b) one of which is away from the housing which is superimposed over the tape so that the first fraction marks are visible to a user and wherein the fraction indicator is marked with fractions (22) of measurement in arabic numerals adjacent second fraction marks (21) in increments between two whole numbers with the fractions increasing in amount towards the housing and wherein the indicator has a length of the elongate surface and can be positioned adjacent the first fraction marks with the end of the elongate surface away from the housing on a whole number of the tape so that a selected first fraction mark on the tape can be easily translated into a fraction by the user.

2. The tape measure of claim 1 wherein the first fraction marks are marked in a contrasting color on a first colored background on the tape and wherein the fractions and second marks on the indicator are marked in a contrasting color on a second colored background which is different from the first colored background.

3. The tape measure of claim 1 wherein the fractions are marked on the fraction indicator in 1/16, ⅛ and ¼ inch increments adjacent the second fractional marks for a length of at least one inch.

4. The tape measure of claim 1 wherein the fraction indicator is pivotably mounted (23) on the housing adjacent the opening and wherein the indicator folds along a side of the housing adjacent the opening during nonuse.

5. The tape measure of claim 1 wherein the first marks are adjacent at least one edge of the tape so as to be visible with the fraction indicator superimposed over the tape.

6. In a tape measure (10) including a housing (11) with an opening and a tape (12) disposed in the housing and projecting through the opening (16) so that the tape can be extended from the housing for measuring, with first fractional marks (13) marked along a length and on at least one of two opposing edges (12b, 12c) of the tape and wherein the tape can be coiled in the housing for storage of the tape the improvement which comprises:

a fraction indicator (20) pivotally mounted on the housng adjacent the opening, wherein the indicator has an elongate surface (20c) which can be superimposed over the tape so that the first indicia adjacent at least one edge (12b) of the tape are visible, wherein the fraction indicator has projections (24) adjacent one end (20b) which are pivotally mounted (23) on the housing and wherein the indicator is marked with second marks (21) and fractions (22) in arabic numerals in increments between two whole numbers with the fractions increasing in amount towards the housing with the second fractional marks (21) adjacent the first fractional marks and wherein the indicator has a length of the elongate surface so that the end of the elongate surface away from the housing and can be positioned on a whole number of the tape so that a selected first fraction mark can be easily translated into a fraction by a user.

7. The tape measure of claim 6 wherein the second fraction marks are marked on the fractional indicator in 1/16, ⅛ and ¼ inch increments for a length of at least about one inch.

8. The method of measuring a length which comprises:

(a) providing a tape measure (10) including a housing (11) with an opening (16) and a tape (12), with first fraction marks (13) marked along a length on at least one of two opposing edges (12b, 12c) of the tape and with whole numbers (14) showing the increments of measurement, the tape being disposed in the housing and projecting through the opening so that the tape can be extended from the housing for measuring and coiled in the housing for storage of the tape and including fraction indicator (20) mounted on the housing adjacent the opening wherein the fraction indicator has an elongate surface (20c) between two opposing ends (20a and 20b) one of which is away from the housing which is superimposed over the tape so that the first fraction marks are visible to a user and wherein the fraction indicator is marked with fractions (22) of measurement in arabic numerals adjacent second fraction marks (21) in increments between two whole numbers and wherein the indicator has a length of the elongate surface and can be positioned adjacent the first fraction marks with the end of the elongate surface away from the housing on a whole number of the tape so that a selected first fraction marks on the tape can be easily translated into a fraction by the user;

(b) extending the tape to a length which places the end of the fraction indicator away from the housing on a whole number of a unit of measurement fractionally shorter than the length to be measured; and (c) measuring the length by reading the fraction indicator and adding the fraction to the whole number adjacent the end of the fraction indicator away from the housing.

9. The method of claim 8 wherein the fraction indicator is marked in fractions of an inch.

10. The method of claim 9 wherein the fraction indicator is pivotably mounted on the housing adjacent the opening and wherein in use the fraction indicator is folded along a side of the housing adjacent the opening during non-use.

11. A device adapted for mounting on a housing (11) of a tape measure (10) to facilitate the measurement of fractions which comprises:

a fraction indicator (20) including retaining means for mounting the indicator on a housing of the tape measure with an opening (16) for extending the tape (12), wherein the fraction indicator has an elongate surface (20c) between opposing ends (20a and 20b) so that one end is away from the housing which can be superimposed over the tape so that first fraction marks (13) on the tape are visible and wherein the fraction indicator is marked with fractions (22) in arabic numerals adjacent second fraction marks (21) in increments between two whole numbers with the fractions increasing in amount towards the housing and wherein the indicator has a length of the elongate surface and can be positioned adjacent the first fraction marks with the end of the elongate surface away from the housing on a whole number of the tape so that a first selected mark on the tape can be easily translated into a fraction by the user.

12. The device of claim 11 wherein the retaining means is adapted to be pivotally mounted (23) on the housing adjacent the opening so as to be superimposable over the tape in an unfolded position and so as to be foldable along a side of the housing adjacent the opening during non-use.

13. The method of claim 8 wherein the function indicator has a contrasting color from the tape.

* * * * *